United States Patent [19]
Heying et al.

[11] 3,727,582
[45] Apr. 17, 1973

[54] METHOD AND MEANS FOR GROWING AND SHIPPING PULLETS OR BROILERS

[76] Inventors: Hilarius L. Heying; Josephine M. Heying, both of 115 Jefferson Street, West Union, Iowa 52175

[22] Filed: Feb. 12, 1971

[21] Appl. No.: 114,774

Related U.S. Application Data

[63] Continuation-in-part of Ser. No. 664,173, Aug. 29, 1967, abandoned.

[52] U.S. Cl. ................................. 119/18, 119/21
[51] Int. Cl. ............................................. A01k 31/06
[58] Field of Search ........................... 119/17, 18, 21; 128/305

[56] References Cited

UNITED STATES PATENTS

| | | | |
|---|---|---|---|
| 3,465,722 | 9/1969 | Duff | 119/18 |
| 3,478,721 | 11/1969 | Maxfield | 119/18 |
| 1,771,492 | 7/1930 | Karlson | 119/17 |
| 2,869,549 | 1/1959 | Lochmiller | 128/305 |
| 2,061,712 | 11/1936 | Martin | 119/18 X |
| 2,892,562 | 6/1959 | Smithson | 119/17 X |
| 3,396,702 | 8/1968 | Trussell | 119/17 |

*Primary Examiner*—Hugh R. Chamblee
*Attorney*—Berman, Davidson & Berman

[57] ABSTRACT

A method of growing and shipping pullets or broilers comprising: hatching a flock of baby chicks; dividing the flock into groups of from about four to about twenty or more; placing each group in a separate cage; raising the birds in the cages to the age of 20 to 22 weeks and shipping to buyers in the cages in which they were raised.

Means for growing and shipping chicks comprising a cage sized to accommodate from about four to about twenty or more birds of laying age; feed and watering means adjustable to accommodate growth; support means to suspend the cages from brackets; bird access means on each cage; means to detach the cages from the support means for shipping the cages.

5 Claims, 6 Drawing Figures

PATENTED APR 17 1973 3,727,582

INVENTORS.
HILARIUS L. HEYING,
JOSEPHINE M. HEYING,
BY
Berman, Davidson & Berman,
ATTORNEYS.

INVENTORS.
HILARIUS L. HEYING,
JOSEPHINE M. HEYING,
BY
Berman, Davidson & Berman,
ATTORNEYS.

METHOD AND MEANS FOR GROWING AND SHIPPING PULLETS OR BROILERS

The present application is a continuation-in-part of our copending application Ser. No. 664,173, filed Aug. 29, 1967, entitled Method and Means for Growing and Shipping Pullets, now abandoned.

In this country today there is a growing tendency on the part of egg producers to buy pullets at or about laying age rather than to purchase day-old chicks and raise them for the 20 or 22 weeks necessary to enter the laying period. Ordinarily, when chicks are hatched, they are immediately subjected to sexual classification and the babies are sold in the category of pullets or cockrells or run of the mine, the latter category being divided more or less equally between pullets and cockrells. The present invention is concerned primarily with raising and shipping pullets and broilers.

For the first 6 or 8 weeks after hatching, the birds are extremely sensitive to temperature and unless the coop containing such birds has extremely careful heat regulation, it is almost indispensible that the birds be floor-raised so that when low temperatures are encountered, the birds can protect themselves by huddling together. After about six or eight weeks, however, the birds are not nearly so temperature-sensitive and the bunching up process is no longer essential to survival.

Before proceeding to a detailed disclosure of the present invention, it is necessary to establish certain facts about "life among the pullets," of which the present invention takes account. Any group of fresh hatched chicks will in course of time establish a "pecking order." This will occur despite the size of the group. A definite observable pecking order will be established in a group as small as four or as large as 4,000. The tendency to establish the order, however, does not become clearly manifest in the first six or eight weeks of life but develops rapidly thereafter and is distinct and easily observable by the time the birds have reached laying age.

Between the ages 6 days and 18 weeks, the birds may be debeaked, wormed and vaccinated if necessary. The worming process is accomplished by adding ingredients to the feed or the water and is not particularly shocking to the birds. The debeaking process, however, involves, in effect, individual surgery or medicinal application on each bird and when this is attempted on a large number of floor-raised birds, there is very considerable shock. If, however, the birds are confined in small groups in individual cages, the shock is minimized.

When it is time to ship floor-raised pullets, the job of catching and cooping them involves in itself a very considerable shock.

It is a major objective of this invention to eliminate the various shocks by breaking the flock up immediately after sex classification at birth, into small groups with a cage for each group so that each cage contains from four to twenty or more birds, depending on the type of nesting cages used by the customer. When pullets are sold at laying age, they are raised to order and contracted for before the hatch. It thereupon becomes entirely feasible to adjust the groups at the hatchery.

The above and other objects of this invention will be made clear from the following detailed description when taken in connection with the annexed drawings, in which.

Figure 1:
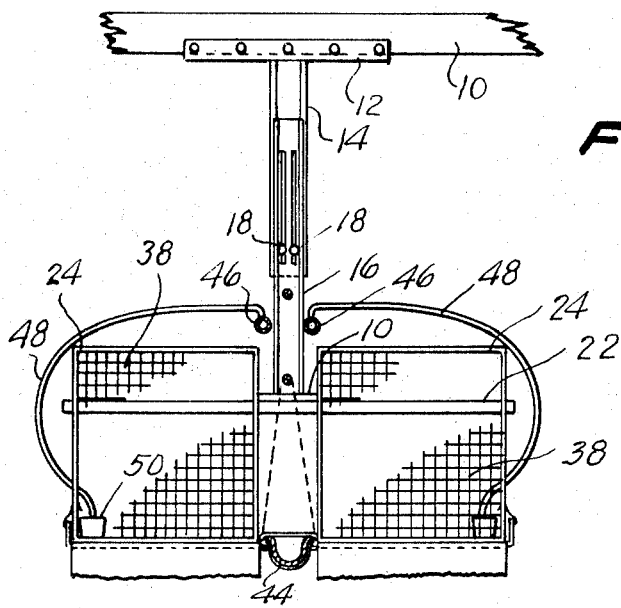
FIG. 1 is a front elevation showing the system for suspending a plurality of cages.
Figure 2:
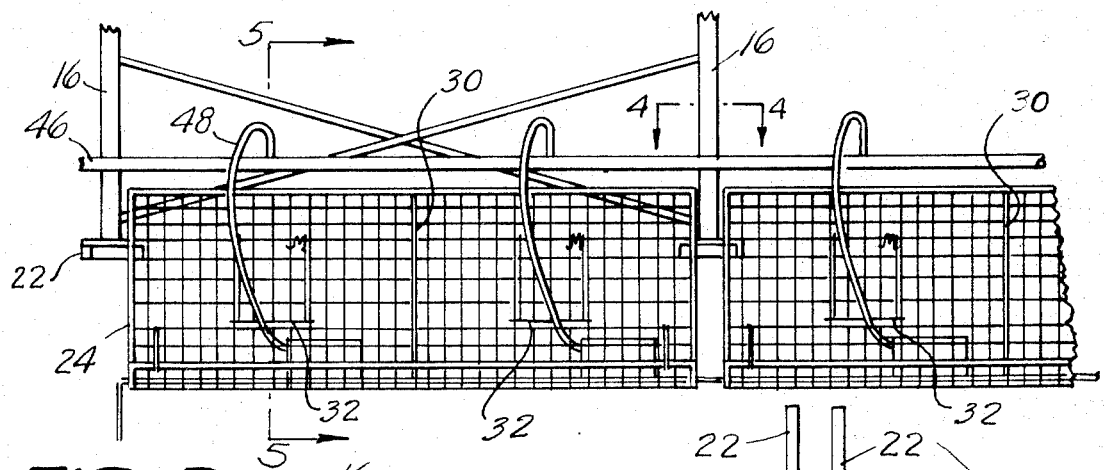
FIG. 2 is an elevation taken at right angles to FIG. 1.
Figure 3:
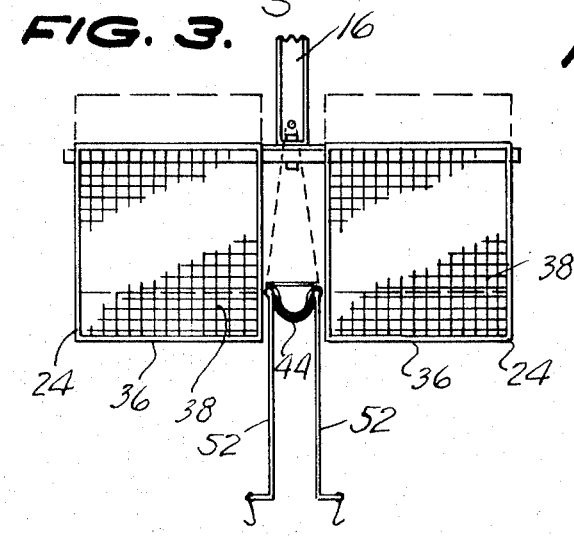
FIG. 3 is a view similar to FIG. 1 illustrating the floor supports in depending relation.

Referring now to FIGS. 1 and 2, the building in which the cages are mounted is provided at or adjacent the ceiling with a plurality of cross beams 10. Spaced along each cross beam 10 are a plurality of angle irons 12. Centrally welded to each angle iron 10 is a length of channel 14, a second length of channel 16 slidably fitting within the channel 14 depends therefrom. In the region of overlap of channels 14 and 16, they are slotted and held together in a vertically adjustable relationship by bolts 18. To the lower end of each channel 16 (see FIG. 5) is welded a plate 19. A plate 20 is pivotally secured to the plate 19 by a pivot bolt 21 having a vertical axis. To each plate 20 there are welded a pair of angle irons 22. Angle irons 22 project horizontally from the channels 16 and are engageable by cages 24. The cages 24 are not laying cages but rather growing and shipping cages and are completely rectangular in outline. The usual laying cage has a sloped bottom for egg delivery and is not suitable for shipping or stacking which, of course, is precisely what is to be done with the cages 24 disclosed herein.

Figure 5:
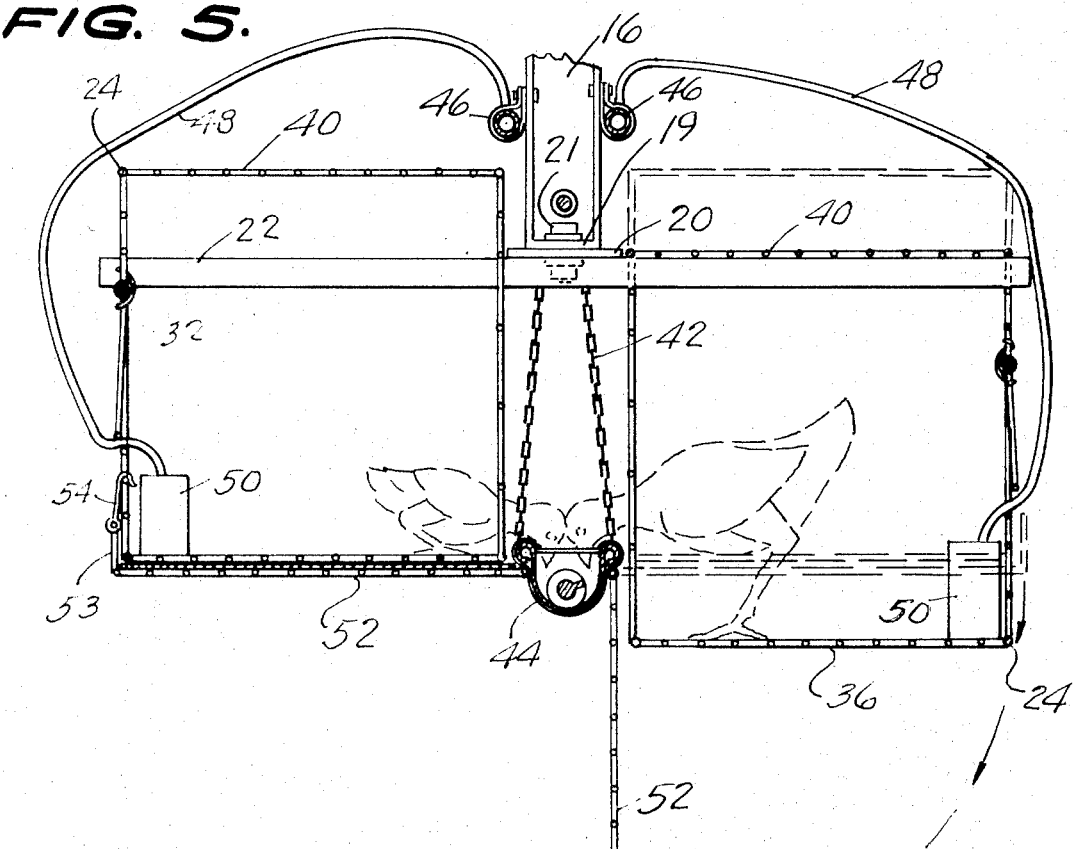
FIG. 5 is an enlarged vertical sectional view, taken on the line 5—5 of FIG. 2, looking in the direction of the arrows.
Figure 6:
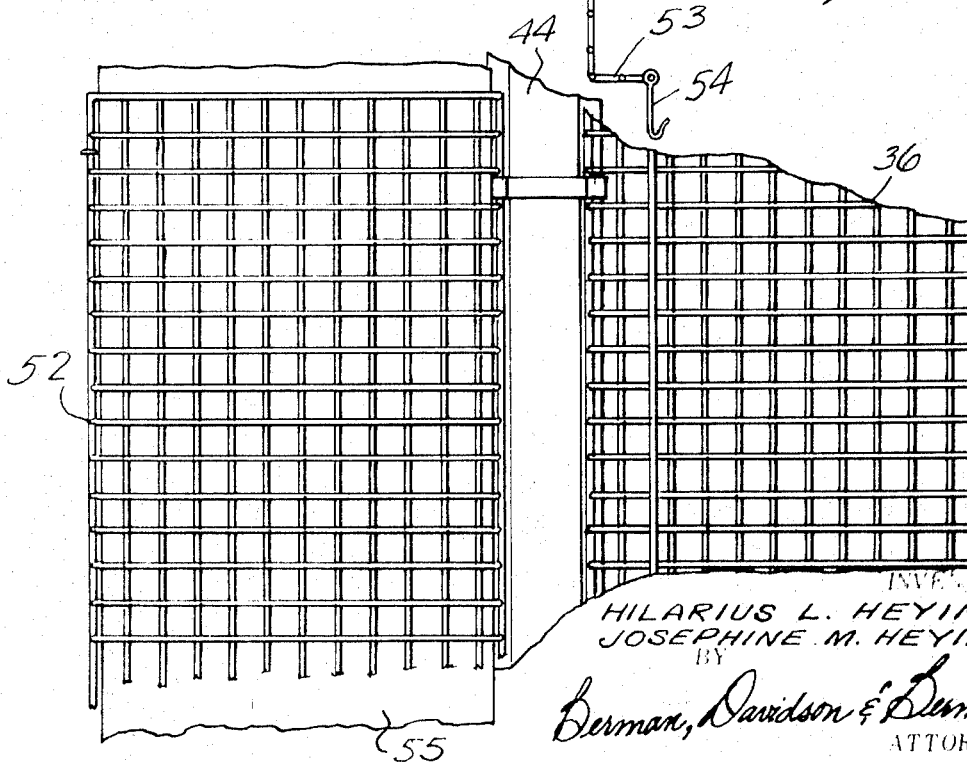
FIG. 6 is a fragmentary bottom plan view.

Each cage 24 has a central mesh partition 30 which divides the cage into two compartments and each compartment has an access door 32. The cage bottoms 36 are made of about 1-inch square mesh as are the partitions 30 between the compartments as well as the cage ends 38 and the tops 40. The mesh on front and rear walls is preferably about 1 inch by 2 inches with the 2-inch dimension in the vertical. Suspended from the vertically adjustable channel 16 and vertically movable therewith are a series of chain loops 42 going down between adjacent rows of cages and having each strand carrying a feed trough 44. The troughs 44 are individually vertically adjustable relative to the cages by changing their position on the lengths of the chains 42. The cages 24 may be vertically adjusted with respect to the trough 44 by inserting the angle irons 22 through lower or higher members in the front and rear of the cage as is seen in FIG. 5. This accommodates the growth of the bird. The troughs are automatically fed from a conventional feeder (not shown).

A pair of water pipes 46 are supported on opposite sides of the channel 16 and extend the full length of the row of cages 24. A flexible conduit 48 extends from the pipe 46 to an automatic waterer 50 contained in each compartment of the cages 24.

A wire mesh tray 52 is hingedly secured to the trough 44 to underlie each of the cages 24 and can be swung from a depending out of use position as shown in the right hand side of FIG. 5 to a generally horizontal in use position against the bottom of the cage 24 as shown in the left hand side of FIG. 5. Each of the trays 52 have an upturned flange 53 formed along the side edge thereof opposite the trough 44 and a hook 54 is mounted on the flange 53 for detachably securing the tray 52 to the cage 24. A paper sheet 55 is supported on the tray 52 against the bottom of the cage 24 to prevent cold air from flowing upwardly through the bottom of the cage 24 and to support the feet of the baby chicks when they are small enough to pass through the wire mesh of the bottom of the cage 24.

During the use of the paper sheet 55 the droppings will collect thereon and can be removed by lowering the tray 52 and replacing the paper sheet 55.

Figure 4:
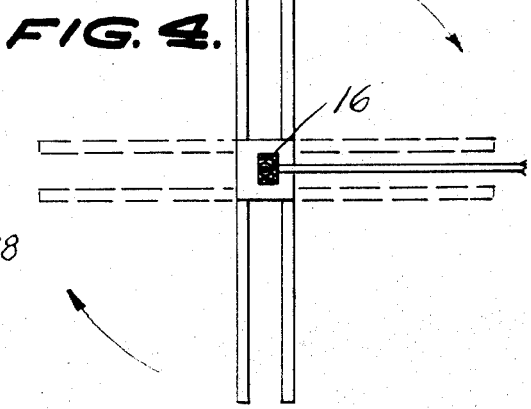
FIG. 4 is a section on the line 4—4 of FIG. 2, looking in the direction of the arrows.

When all of the cages 24 of a row of cages have been removed the angle iron members 22 may be swung parallel to the rows as seen in FIG. 4 to permit mechanical cleaning machines to be moved down the rows.

In the raising of pullets by the method of the instant invention, the sex-classified baby chicks are placed in the cages 24 with the trays 52 supporting a sheet of paper 55 against the bottom of the cage. The cage is located in a building which is heated and controlled to brooder temperature to keep the chicks at the right growing temperature.

At the end of about 3 weeks the trays 52 are dropped and the cages 24 are lowered with respect to the angle irons 22 and trough 44 as required. Between 8 and 18 weeks the birds are debeaked, wormed and vaccinated but are immediately replaced in the cage with the same group of birds following the debeaking step.

At the end of about 20 to 22 weeks the cages 24 are removed, stacked and shipped to the egg producers for transfer in the same grouping to the laying cages with the growing cages 24 being returned for reuse.

While we have described the invention as applied to pullets being raised for egg-laying, it would be understood that the method is equally applicable to broilers raised for their meat.

What is claimed is:

1. A method of growing and shipping pullets or broilers comprising: providing a support means to removably receive and adjustably support cages suitable for raising chicks to laying age and for shipping the pullets or broilers in said cages; providing feed means attached with said support means having means whereby removable solid floors are positioned beneath and adjacent the cages; placing a plurality of chicks in each cage when said chicks are about one day old with the cages in an elevated position relative to said feed means whereby day old chicks have access thereto; providing food in said feed means and water means for said chicks; releasing said means and removing the solid floor when the chicks are about 3 weeks old and lowering the cages relative to said feed means whereby older chicks have easy access to the feed means; maintaining said cages in a warm atmosphere until said chicks are about three weeks old and removing the cages from the support means and shipping said cages with said chicks therein at an age of about 20 to about 22 weeks.

2. A method as claimed in claim 1 in which said chicks are maintained in the same social group after initial placement in the cages.

3. A method as claimed in claim 1 in which the chicks are placed in the cages in groups of from about 4 to about 20 and are maintained in the same social group after initial placement in the cage.

4. A method as claimed in claim 1 in which birds of any age, either male or female, are transportable in said same cages used during the brooding and growing period.

5. A method as claimed in claim 1 including the steps of debeaking the chicks at between 6 days and 18 weeks of age.

* * * * *